July 21, 1964  A. J. CERTA  3,141,753
PROCESS OF MAKING GLASS-TO-METAL SEALS
Filed March 29, 1961

SELECTIVELY OXIDIZING IRON-BASED ALLOY → ESTABLISHING CONTACT OF GLASS WITH OXIDIZED SURFACE → HEATING TO EFFECT HERMETIC JUNCTURE

INVENTOR.
ANTHONY J. CERTA
BY
AGENT

3,141,753
PROCESS OF MAKING GLASS-TO-METAL SEALS
Anthony J. Certa, Norristown, Pa., assignor, by mesne assignments, to Philco Corporation, Philadelphia, Pa., a corporation of Delaware
Filed Mar. 29, 1961, Ser. No. 99,090
1 Claim. (Cl. 65—43)

This invention relates generally to the art of making glass-to-metal seals and more particularly to a unique process of fabricating seals to alloys of iron containing nickel and/or cobalt.

While of broader applicability, the invention has particular utility in the manufacture of semiconductor devices of the type requiring hermetic encapsulation and it is in this particular field of application that the process steps of the invention are described.

It is general knowledge that there is an affinity between certain metal oxides and glass. To insure good adherence between the glass and metal it is often necessary to provide an oxide interface between the metal and glass to serve as the bonding media. The oxide interface during sealing undergoes partial dissolution in the molten glass hermetically bonding the glass to the metal, an occurrence commonly referred to as "wetting."

The conventional practice of forming an oxide upon surface portions of a nickel-cobalt-iron alloy preparatory to seal formation is to heat the metal to the relatively high temperature of approximately 800° C., followed by cooling in air. This procedure in the absence of extreme care is often productive of a non-uniform oxide coating. Moreover, oxides formed in this manner are extremely sensitive to variations in sealing temperature. For example, when too high a sealing temperature is employed there is excessive oxide growth resulting in impairment of the strength properties of the coating. On the other hand if too low a temperature is used the glass is hard to work and there is insufficient wetting of the oxide interface, resulting in a defective seal.

Accordingly, it is a general object of this invention to provide a process of producing seals which obviates the limitations and difficulties of prior art procedures.

A more detailed object of this invention is to provide a process of oxidizing, iron alloys of the type mentioned, which is productive of a dense, uniform and adherent oxide advantageously adapted to the formation of glass-to-metal seals.

A still further object of this invention is to provide a sealing process which is less sensitive to variations in sealing temperature, and therefore more readily adaptable to present day mass production techniques.

The term "glass" as used herein is to be given a broad connotation as including glasses of varying composition, frits, and other similar vitric materials.

Briefly stated, the invention relates to a unique process of sealing glass to alloys containing iron-nickel and/or cobalt which comprises chemically and selectively oxidizing the iron constituent of the alloy by immersing the part in a low temperature solution containing an oxidizing agent in an alkaline medium. Following this low-temperature oxidation the seal is made by bringing the glassing media into intimate contact with the oxidized surface of the alloy and heating the assembly to a temperature sufficient ot effect hermetic juncture of the component parts. The oxide formed by the process is readily controllable, dense, uniform, and strongly adherent to the metal substrate. Accordingly, a workpiece oxidized in conformity with the method teachings of this invention contains an oxide coating which is more stable and more readily usable as a bonding media. Because of these advantages the "glassing" phase of the sealing process becomes less critical permitting an increased yield in acceptable seals with a concomitant reduction in system complexity.

A further area of disadvantage attendant the use of prior art oxides is their low mechanical strength and poor resistance to abrasion. This presents a serious problem in continuous feed processes, such for example as the oxidation of wire fed from spools which results in repetitive flexure of the work piece. Additionally this oxide defect presents a serious limitation to the handling of such parts by high-speed processing machinery commonly used in the present day fabricating procedures.

It is accordingly a still further object of this invention to provide a seal-forming process which embodies an oxidizing step productive of a mechanically strong oxide tenaciously adherent to the base metal and highly resistant to mechanical abrasion.

These and other objects within contemplation will be more readily understood by reference to the following detailed description and drawings, in which.

Figure 4:
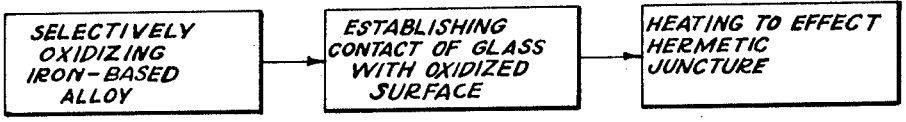
Figure 3:
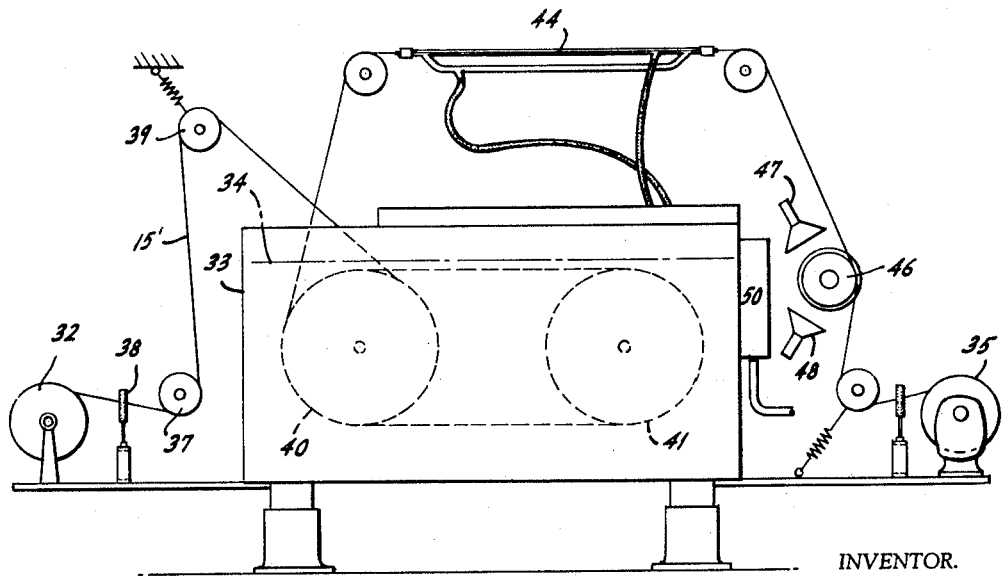

FIGURE 3 diagrammatically illustrates a type of apparatus designed for the continuous-feed processing of wire, a technique made available to the sealing art through the teaching of this invention; and FIGURE 4 is a flow diagram of the manipulative steps comprising the method aspects of the invention.

Figure 1:
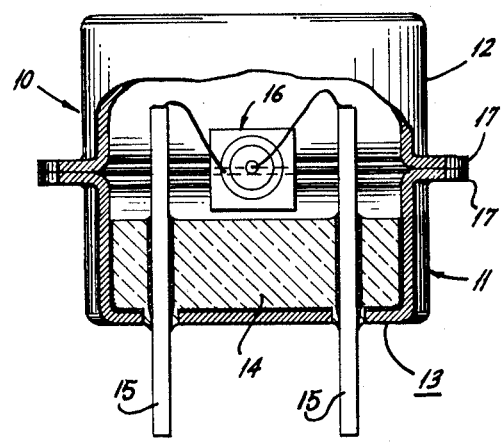
FIGURE 1 is an enlarged, sectional view, depicting an encapsulated transistor assembly embodying seals made in accordance with the present invention.

FIGURE 1 shows a transistor assembly 10 comprising an eyelet type stem assembly 11 and an overlying hat-like encasing member 12. The stem eyelet 13 houses a core of insulative material such as boro-silicate glass 14 hermetically sealed to the eyelet and traversed by a plurality of leads 15 providing electrical accessibility to the encased semiconductive element 16.

In the fabrication of semiconductor devices of the type shown, it has been found necessary, in order to insure optimum operational life, to hermetically encapsulate the semiconductive element. Encapsulation is conveniently accomplished by hermetically joining the confronting flanges 17 of the can 12 and eyelet 13.

To insure a seal of minimal stress between the elements of the stem assembly 11, the eyelet and leads are made from a nickel-cobalt-iron alloy having a coefficient of expansion closely approximating that of the boro-silicate glass 14. One such alloy which has been found particularly effective is that having the registered trademark Kovar. This alloy is composed of about 35% nickel, 12% cobalt and the balance iron with certain trace amounts of impurities the identification of which is not here necessary.

As previously indicated seals made using prior art techniques employing alloys of this type required excessive care both in the surface preparation of the alloy preparatory to seal formation and during the glassing phases of the sealing process. By resort to the present invention these difficulties have been avoided. While the invention is advantageously highlighted by the applications to be described, it should be understood that the concepts of the invention are applicable in other fields where the making of seals to nickel-iron-cobalt alloys is of importance.

The various method steps in the fabrication of the stem assembly 11 are described in detail below.

For most effective treatment the eyelet 13 and leads 15 are first thoroughly surface cleaned by any of a number of commercially available techniques. One method is to degrease the parts in trichlorethylene for 15 minutes. This is desirably followed by firing in wet hydrogen for 20 minutes at 1000° C. after which the part is pickled in 1:1 hydrochloric acid for one minute. Another equally effective technique is to first degrease the part in a 20% solution of potassium hydroxide followed by a slight etch in a 20% solution by volume of HCl to remove any latent oxide film formed on the surface of the metal. Any of numerous commercially recognized techniques, of which the above are exemplary, may be employed to obtain a body of metal substantially free of surface contaminants. This step, while not indispensible to the method teachings of the invention, is highly desirable if consistently satisfactory results are to be obtained.

After cleaning, the parts are chemically oxidized by immersion in a solution—the specific details of which are described below—designed selectively to oxidize the iron component of the alloy. This treatment produces a uniform adherent coating of black iron oxide $Fe_3O_4$ on exposed surface portions of the metal. Numerous commercially available formulations may be employed for this purpose, the essential criteria being that the solution contain an oxidizing agent having an oxidizing potential sufficient to react with iron but insufficient to affect the nickel and/or cobalt constituent of the alloy, and that the solution be basic in order that there be no dissolution of the base metal. One representative solution is to use an hydroxide of any alkaline earth metal such as sodium or potassium in combination with an oxidizing agent such as sodium nitrite or sodium nitrate. A formulation found to effectively oxidize Kovar involves use of a salt mixture comprising 66% sodium hydroxide (NaOH) and 34% sodium nitrate ($NaNO_2$). The oxidizing bath was prepared by adding a sufficient quantity of this mixture of salts to distilled water until the boiling point of the solution was raised to the desired operating temperature. In the illustrated case an operating temperature of 142° C. was maintained throughout the oxidizing phase of the process. The eyelet and leads are immersed in this solution for a period of about 30 minutes. The parts are then removed from the solution and washed in running water. The concentration of salts and pH of the solution can be varied over a considerable range so long as the solution remains basic, the general rule being that the lower the concentration the longer the exposure required to produce the desired surface oxidation. Oxidation can be materially accelerated by increasing the temperature and/or concentration of the solution.

Figure 2:
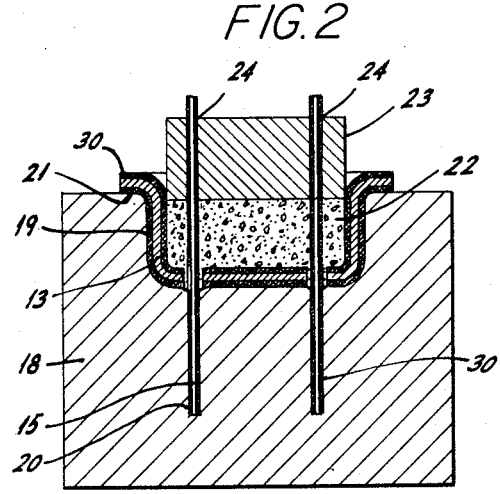
FIGURE 2 illustrates one form of apparatus for fabricating glass-to-metal seals using a powdered glass compaction technique.

One convenient method of forming the glass-to-metal seal following this low temperature chemical oxidation of the eyelet and leads is to employ the powdered glass compacting technique disclosed and claimed in copending application Serial No. 654,907, filed April 24, 1957, now abandoned, and assigned to the assignee of the present invention. One arrangement for carrying out this type of seal formation is shown in FIGURE 2 and comprises a mold 18 containing an eyelet receiving cavity 19, the bottom surface of which is provided with suitable positioning apertures 20 for receiving the leads 15. The cavity 19 is of a depth permitting eyelet 13 on insertion thereof into said cavity to rest on the cavity floor, the lower surface of the eyelet barely making contact with the upper surface 21 of the die 18.

With the eyelet and leads in position within the mold 18 the cavity is charged with a powdered borosilicate or potash-soda lead glass mixture 22 having a normal sealing temperature in the range of 800–850° C. the glass being ground so as to produce a substantially homogeneous mixture of −60+80 mesh particles.

The powdered glass is then compacted by means of a suitably apertured cylindrical piston 23 which, through hydraulic or other suitable means, is brought into bearing relation with the powdered glass as shown in FIGURE 2. The apertures 24 within the piston 23 are oriented to register with the guides 20 in mold 18 in order to maintain lead orientation during compression of the powdered glass. It has been found that a force of about 3000 lbs. exerted on the mixture through the intermediation of the piston 23, which piston is adapted to slide within the eyelet 13, produces adequate mechanical integration of the particles to maintain the leads in requisite orientation during subsequent phases of fabrication and produces sufficiently intimate contact between the leads, glass core and eyelet that an acceptable hermetic seal may be made on subsequent firing, without the necessity of further compaction. To complete the seal the cold pressed stems are heated by any suitable means, for example in an electric oven, to sealing temperature, a representative temperature when using a potash-soda-lead glass being in the approximate range of 800–850° C.

The firing temperature, however, is not critical and may have a considerable range of variation depending on the composition of the powdered glass employed.

Chemical treatment of the Kovar in the manner previously described selectively oxidizes the iron constituent of the alloy to black $Fe_3O_4$. This oxide is of uniform composition, tenaciously adherent to the metal substrate and sufficiently dense to inhibit further oxidation of the alloy during the "glassing" phase of the sealing process. Moreover, unlike prior art oxidation procedures used in preparing oxides for seal formation, the oxide coating 30 formed on surfaces of the metal which do not enter into the seal formation (compare FIGURES 1 and 2) may be readily removed by chemical means without damage or resulting dimensional change of the base metal. One satisfactory method is to expose these surfaces to a cold, dilute hydrochloric acid etch. The previously required method of removing the unwanted oxide was to subject the glass to a hot concentrated solution of hydrochloric acid which while removing the oxide attacks the base metal. The ease of oxide removal experienced when practicing the process teachings of this invention is occasioned by the fact that the prior art method of producing a suitable oxide for purposes of forming a seal gave rise to a composite coating which comprised an admixture of iron, cobalt and/or nickel oxides which coating was difficult to remove by chemical means without attacking the base metal. By selectively oxidizing the iron this problem has been eliminated.

As indicated previously the seal forming process constituting the invention is equally applicable to nickel-iron alloys such for example as No. 42 and No. 52 alloy as well as to nickel-cobalt-iron alloys of the type described.

Furthermore by utilization of this unique sealing method, procedures which have heretofore been impractical in the mass production of seals of this type are for the first time feasible. Illustrative of these ancillary advantages is that of preparing wire, such as that used in the making of leads 15, by a continuous feed process. This process is not practiced when using wire which has been oxidized in accordance with prior art techniques because of the brittle nature of the oxide produced. One convenient form of apparatus for carrying out this pre-glassing oxidation is that shown in FIGURE 3 wherein the wire 15' is paid off a spool 32 into a tank 33 containing a suitable oxidizing solution 34, the composition of which has been described previously. The wire is immersed in this solution for the requisite time necessary to produce the desired oxide thickness after which it is washed, and rewound on the power driven spool 35. The input pulley 37 is isolated from the transverse movements of the wire 15' as it unravels from spool 32 by means of aligning bobbins 38. The wire is kept under constant tension during operation by the spring loaded pulley 39. Given a fixed feed rate the required residence time of the wire in the oxidizing solution is controlled by fixing the number of passes the wire makes while in the tank. In the illustrated example the wire is fed over drums 40 and 41, each of which is provided on its surface with a series of helically cut grooves (not shown). This construction permits the wire to advance laterally across the width of the tank, a distance equal to the pitch of the helical grooving for each complete traverse of the wire back and forth across the length of the tank. After the wire has been immersed for the prescribed period of time it is withdrawn from the tank and washed in the tubular section 44. This section is maintained in sufficiently close proximity to the point at which the wire emerges from the bath to insure removal of any residual oxidizing solution before it becomes encrusted on the surface of the wire.

Following the washing phase, the wire is dried and wrapped on the motor driven spool 35. One convenient arrangement for drying the wire is to loop it over a hub 46 irradiated by opposed infrared lamps 47 and 48.

The bath temperature, when using this particular arrangement, may be conveniently controlled by operating the bath at the boiling point. The solution may be heated by any of a number of conventional techniques as for example by means of a bank of immersion heaters, not shown, disposed at the bottom of the tank 33. Make-up water is added to replace that lost by evaporation by means of a float-controlled inlet water system 50 of conventional construction.

Wire oxidized in this rapid and inexpensive manner may then be further mechanically processed and used in applications, such as the one previously described, embodying the seal fabrication process comprising this invention.

To summarize, the invention provides a novel process of making seals to alloys of iron containing nickel and/or cobalt and includes, as an essential step, the selective, low temperature chemical oxidation of the iron constituent of the alloy. The thickness of the oxide thus produced is empirically determined in accordance with the end use to which it is to be put. An illustrative example of this technique has been described above in connection with the oxidation of parts for use in making stem closures for semiconductor devices. For example when using the specific formulation of 66% sodium hydroxide and 34% sodium nitrate dissolved in a sufficient quantity of distilled water to raise the boiling point of the solution to 142° C. the desired thickness of oxide necessary for making a glass-to-metal seal was produced by immersing the metal part in the solution for a period of about 30 minutes.

By resort to the overall process there is achieved a more flexible procedure for the fabrication of seals and one which is productive of a more reliable and uniform end product. Moreover, this process has certain interrelated ancillary advantages in making available to the sealing art beneficial procedures not heretofore feasilbe, such for example as that illustrated and described above respecting the oxidation of wire preparatory to seal formation.

While the invention has been described with particular reference to specific practice and embodiments, it will be understood by those skilled in the art that the invention is susceptible to changes and modifications without departing from the scope thereof, as defined in the appended claim.

I claim:

In the hermetic sealing of glass to a metalic element consisting of an alloy selected from the group consisting of iron-nickel-cobalt and iron-nickel, the process which comprises:

(a) immersing surface portions of said element in a solution consisting essentially of sodium hydroxide and sodium nitrate to produce on said surface portions a ferrosoferric oxide coating;

(b) placing glass in contact with surface portions of said oxide coating; and (c) heating said glass to a temperature sufficient to effect hermetic juncture between said glass and said oxide coating.

References Cited in the file of this patent

UNITED STATES PATENTS

| | | |
|---|---|---|
| 1,350,907 | Yanai | Aug. 24, 1920 |
| 1,608,612 | Miller | Nov. 30, 1926 |
| 2,219,573 | Fraenckel | Oct. 29, 1940 |
| 2,549,504 | Messana | Apr. 17, 1951 |
| 2,560,593 | Pask et al. | July 17, 1951 |
| 2,955,385 | McDuffee | Oct. 11, 1960 |

FOREIGN PATENTS

| | | |
|---|---|---|
| 355,119 | Great Britain | Aug. 20, 1931 |